United States Patent [19]
Boswell

[11] 3,972,160
[45] Aug. 3, 1976

[54] ROTARY LAWN MOWERS

[75] Inventor: Gordon Henry Boswell, Auckland, New Zealand

[73] Assignee: Mason & Porter Limited, Auckland, New Zealand

[22] Filed: Apr. 1, 1975

[21] Appl. No.: 564,050

[52] U.S. Cl. .................................. 56/255; 56/17.2; 280/43.13
[51] Int. Cl.² ......................................... A01D 55/18
[58] Field of Search .................. 56/17.1, 17.2, 17.5, 56/255; 280/43.13, 43.17, 43.19, 43.21, 43.22

[56] References Cited
UNITED STATES PATENTS

| | | | |
|---|---|---|---|
| 2,568,822 | 9/1951 | Pervis | 56/17.2 |
| 2,986,402 | 5/1961 | Winton | 280/43.13 |
| 3,292,351 | 12/1966 | Larson et al. | 56/17.2 |
| 3,677,574 | 7/1972 | Cyr | 280/43.13 |

*Primary Examiner*—Russell R. Kinsey
*Attorney, Agent, or Firm*—Holman & Stern

[57] ABSTRACT

A rotary-blade type mower having a blade which is power-driven and mounted in a housing, the housing having an open-bottomed rearwardly-opening grass-discharge chute; rear wheels on the housing being pivotally fixed to opposite sides of the mower by rear wheel mounting and an interconnecting rod extending between the rear wheel mountings and having an intermediate bend along its length so that part of the interconnecting rod passes above the rearwardly-opening grass-discharge chute and another part of the rod being disposed at a lower level; a control handle engaged with the rod so that by operating control handle the rod is moved to cause the wheel mounting members to rotate about their pivotal mountings and vary the height of the housing and the blade rotating therein.

5 Claims, 2 Drawing Figures

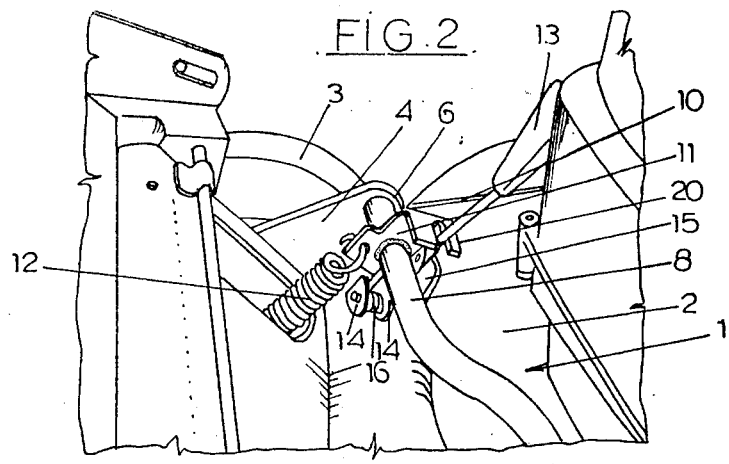
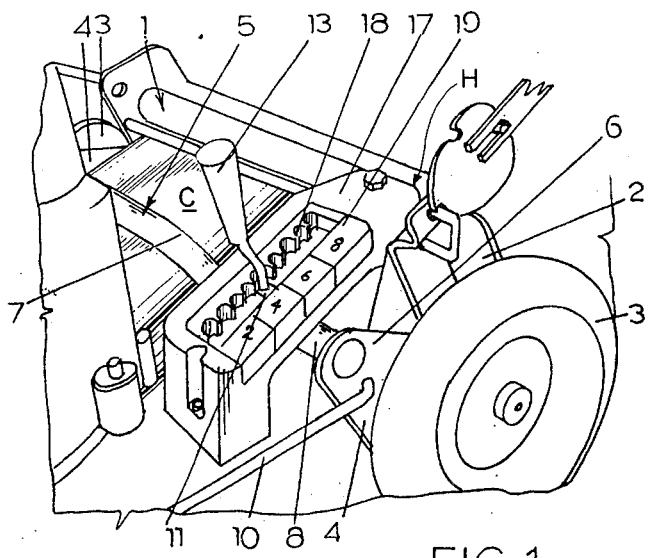

ROTARY LAWN MOWERS

FIELD OF THE INVENTION

This invention relates to rotary blade mowing machines.

BACKGROUND OF THE INVENTION

Rotary mowing machines have two desirable features, i.e. first it should be possible to raise and lower the body and in particular the rotating cutter blade mounted in the body housing relative to the ground to alter the cutting height in a simple manner, preferably using only a single control; and second, it is desirable that the exit chute through which grass is propelled into a catcher should be as open as possible and should have few if any constrictions so as to enable grass cuttings to be deposited well towards the rear of the catcher.

SUMMARY OF THE INVENTION

It is therefore an object of the present invention to provide a rotary mowing machine which will meet the foregoing desiderata in a simple yet effective manner or which will at least provide the public with a useful choice.

Accordingly, the invention consists in a rotary mowing device comprising a vehicular body; a rotary cutter mounted in said body and driven by a motor mounted on said body; the body including a housing for the rotary cutter, said housing having a substantially open bottomed grass discharge chute which extends towards the rear of the housing and with which a grass catcher may be associated in use; rear wheel mountings pivotally affixed to each side of the mower body, each rear wheel mounting carrying a wheel and an interconnecting means between said rear wheel mounting, said interconnecting means being intermediately bent along the length thereof so that a part of said interconnecting means passes above said grass discharge chute and the other part of said interconnecting means being disposed at a lower position and having control means associated therewith so that by operating said control means said interconnecting means will be moved to cause said wheel mounting members to be rotated about the pivot thereof.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

One preferred form of the invention will now be described with reference to the accompanying drawings in which:

BRIEF DESCRIPTION OF THE DRAWINGS

FIG. 1 is a perspective diagrammatic view of a part of a rotary blade mowing machine according to the invention, some elements being omitted for clarity; and FIG. 2 is an enlarged perspective view of the rotary-blade mowing machine of FIG. 1, looking into the side opposite that shown in FIG. 1, with the indicating housing removed to show construction details.

DESCRIPTION OF A PREFERRED EMBODIMENT

In the preferred form of the invention a mower 1 is provided which includes a body 2 having a housing therein and a rotary cutter rotatable in the housing and a motor mounted on the body to drive the rotatable cutter within the housing.

The rear wheels 3 are mounted on supporting plates, such as supporting plates 4, which may be substantially triangular mounting the axle of the wheel adjacent one apex of the triangle being pivoted to the body adjacent a further apex and being interconnected by interconnecting means such as crank transverse 5 adjacent the remaining apex 6.

The connecting crank or rod 5 is in the form of a crank having a high part 7 and a low part 8 that is to say the crank 5 is jogged or bent along its length.

The higher part 7 is, in use, positioned above the discharge chute C of the mower and the lower part 8 is positioned at a lower disposition so as to enable a construction wherein the height adjusting control H may be mounted substantially within the confines of the space available between the motor and rear of the mower body.

The connecting plates 4 (only one shown) supporting the wheels, may be of different sizes but will be so proportioned so that movement applied to each wheel will be substantially the same.

The front wheels of the mower may be adjusted in height by means of a link 10 provided on one of the mounting plates 4 and the front wheels may be pivoted about a pivot point by means of a connecting plate similar to connecting plate 4 but operated by the link 10 a satisfactory system of performing the raising and lowering of the front or fore wheels.

The control means H provided to enable the connecting plates 4 to be rotated and the control means comprises a plate 11 which is fixed to the crank 5 by welding for example. The crank 5 may be biased into one position by means of a counterbalance such as spring 12 which is connected at one end to the plate 11 and at the other end to a fixed part of the mower body; so rotation of the crank against the counterbalance spring 12 is able to be easily effected but, also, so that the weight of the mower is substantially counterbalanced by the spring 12.

A handle 13 is provided, and this is pivotally affixed to the plate 11 so that the handle may be moved at least a small distance in a direction substantially longitudinal of the crank 5. A guide is provided in which the handle moves, and this is formed by bending over and bifurcating a part 20 of the plate 11 so that bifurcated arms embrass the handle 13, or joining member 15. A pair of lugs 14 are provided on the plate 11 and an axle passes therebetween; the handle 13 is connected to the axle by joining member 15 which is shaped to pass about one side of the crank 5. Biasing means comprising spring 16 is provided to bias the handle 13 towards the mouth of the slot between the bifurcated arms of part 20 of the plate 11. The control means H also includes an arch member or indicating housing 17 which is provided on the mower and which may be substantially arch shaped and formed, for example, of a plastic material moulded to shape in which a series of notches e.g. notch 18, are provided along one edge of a slot 19 provided in the arch member 17.

Suitable indicia, such as numbered indications, are provided adjacent the other face of the slot 19, as shown. Thus the handle 13 is positioned so that a part thereof is positioned in one of the notches 18 and to move it to an alternative notch the handle is moved against the pressure of the spring 16 outwardly from the bifurcated notch, and the handle moved along the slot 19, which will simultaneously move the crank 5, with handle 13, in an arc about the pivot point in apex 6 on the plate 4. This will cause the wheels 3 to be raised and lowered, and by means of the link 10 the front wheels will also be raised or lowered. When the wheels are in the new desired height, the handle is returned to the nearest notch 18.

Suitable handles (not shown) are provided on the mower body to enable a user to move the mower.

The use of the invention is as follows:

Before commencing mowing, the height of the mower blade may be set by adjusting the wheel height through operation of handle as described above. During mowing, if it is determined that the height should be once again adjusted, the handle 13 can be readily adjusted into a new or different notch 18 and mowering can recommence.

Thus it can be seen that a rotary blade mowing device is provided in which the height of the cutting blade above the ground may be readily adjusted by means of a readily accessible control handle and in a manner such that a relatively fine control of the height may be achieved. It is a particular advantage of the invention that the discharge chute may be raised to a desirable height such as to allow grass cuttings passing through the discharge chute to be discharged through the rear of a catcher (not shown) which is of course desirable.

It is a particular advantage of the invention that obstructions in the form of a connecting crank 5 between the wheels or wheel supporting plates pass above the housing rather than through the discharge chute.

What we claim is:

1. In a mowing device, comprising a vehicular body for running on the ground and for supporting a motor-driven, rotary cutter, the body including a housing for the rotary cutter, said housing have a substantially open-bottom, rearwardly-opening raised discharge chute for connection with a rearwardly-disposed grass catcher, rear wheel mountings pivotally connected to opposite sides of the mower body, each rear wheel mounting journaling a wheel thereon; and an elongated, interconnecting means between said rear wheel mountings and above said housing, said interconnecting means being bent along its length so that a part of said interconnecting means passes above said raised discharge chute and another part of said interconnecting means is disposed at a lower position; and control means connected to said interconnecting means for rotating said interconnecting means in an arc above said discharge chute for pivoting said wheel mountings on said mower body for adjusting the housing vertically with respect to the ground over which the body runs.

2. A structure is claimed in claim 1 in which said control means comprises an arch member mounted on said mower body and having a vertically opening slot therethrough, said arch member being disposed over the lower portion of said interconnecting member, a handle connected to said interconnecting member and extending through said slot, a portion of said slot including notch portions for removably receiving a portion of said handle, and biasing means engaged with said handle for normally urging said handle toward said notch portions so that the handle can be displaced from said notch portions and moved with said interconnecting means in an arc along said slot for adjusting the mounting members of the wheels.

3. The structure as claimed in claim 2 in which said biasing means comprises a spring mounted between said handle and a portion of said interconnecting means.

4. The structure as claimed in claim 3 including a plate fixedly connected to said interconnecting means and movable therewith, said plate having said handle pivotally mounted thereon, said spring extending between said handle and said plate, said plate including a guide portion removably receiving said handle therein.

5. The structure as claimed in claim 4 in which said guide portion comprises a bifurcated part of said plate connected to said interconnecting means.

* * * * *